STORAGE CIRCUIT

Filed Feb. 15, 1966

INVENTOR.
Ellwood P. McGrogan, Jr.
By Samuel Cohen
Attorney

United States Patent Office 3,274,566

Patented Sept. 20, 1966

3,274,566
STORAGE CIRCUIT

Ellwood P. McGrogan, Jr., Cherry Hill, N.J., assignor to Radio Corporation of America, a corporation of Delaware Filed Feb. 15, 1966, Ser. No. 527,566
3 Claims. (Cl. 340—173)

This invention relates to new and improved means for reading the binary digits stored in a shift register, either in increasing or decreasing order of significance.

There are many data processing applications in which it is required that the order of a sequence of binary digits (bits) be reversed. A "two-way" or bidirectional shift register is one conventional circuit which can perform this function. When the bits are shifted in one direction, they may be read out, in serial fashion, in one order, and when they are shifted in the opposite direction, they may be read out, also in serial fashion, but in the reverse order.

If a two-way shift register is made of discrete components, such as individual resistors, diodes and transistors, its design can be relatively economical. A relatively small number of individual components may be wired into the circuit of a "one-way" shift register to make it bidirectional. However, modern shift registers are often made up of integrated circuit modules. Each module is a single package which consists of many circuit elements such as transistors, resistors and the like which are interconnected to realize one or more logic functions. As an example, a module may operate as a flip-flop storage circuit, and may even include the input and output gates associated with that circuit. The package, as a practical matter, cannot be added to or otherwise modified by making minor changes within the package. Each module must be used, as is, and a complete network, such as a shift register, consists of many such modules.

One particular design of a two-way shift register made up of modules such as described above, has been found to require twice the number modules as a comparable one-way shift register. This means that the cost and the space needed for the two-way shift register is approximately double that required for the one way shift register.

The present invention comprises a conventional one-way shift register, which may be made of integrated circuit modules, and certain relatively inexpensive circuit elements associated with that shift register which permit the information stored in the register to be read out in reverse order. The circuit includes a relatively small number of switches, a relatively small number of transfer gates, and an additional one-way shift register having relatively few stages.

Details of the circuit of the invention are given in the explanation which follows and are shown in the accompanying drawings of which:

Figures 1, 2, 3:
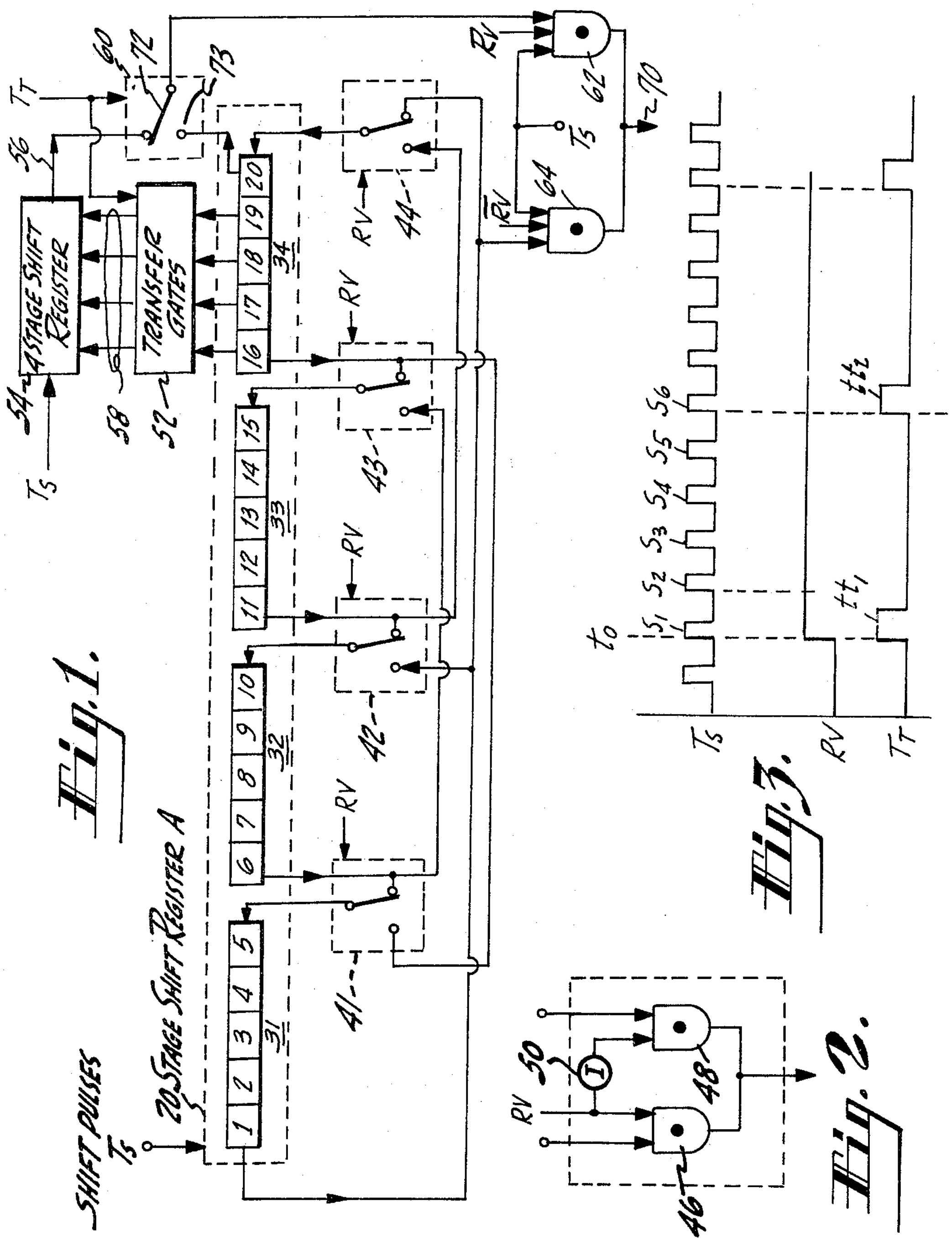
FIGURE 1 is a block circuit diagram of an embodiment of the invention.
FIGURE 2 is a block circuit diagram of a switch for the circuit of FIGURE 1.
FIGURE 3 is a drawing of waveforms present at various points in the circuit of FIGURE 1.

The circuit of FIGURE 1 includes an $n$ stage, one-way, shift register A ($n$ is 20 in this particular example). The register is subdivided into $k=n/x$ groups of $x$ stages each. In this particular example, $x=5$ and $k=4$. The first stage of each group of stages is connected through switches to the last stage of the preceding group of stages. The first stage of the first group of stages 1 to 5 is connected through a switch to the last stage of the last group of stages 16–20. In mathematical terms, the first stage of the $i$'$^{th}$ group is connected to the last stage of the $$i \underset{k}{\ominus} 1\text{'th}$$

group, where $$\underset{k}{\ominus}$$

represents modulo $k$ subtraction, and $i=1, 2 \ldots k$.

In the particular example illustrated, as there are four groups of stages 31, 32, 33 and 34, respectively, there are four switches 41, 42, 43 and 44, respectively. The switches are shown as single-pole, double-throw devices and, in practice, may be implemented by circuits which include semiconductor devices. One form of logic circuit for the switch (there are others) is shown in FIGURE 2 and is discussed later.

The circuit of FIGURE 1 also includes a set of four transfer gates, illustrated by the single block 52, connected between the group of stages 34 and a four-stage, one-way, shift register 54. These gates, when enabled by a transfer signal $T_T$, transfer the information stored in the 16th through the 19th stages of shift register A to shift register 54. They transfer the information in such order that when the shift pulses $T_S$ are applied to the register 54, the information is shifted out of this register onto output lead 56 in the reverse order from which it is stored in stages 16–19. In other words, the bit stored in stage 19 is shifted out of register 54 first; the bit stored in stage 18 is shifted out of register 54 second, and so on. Depending upon the arrangement of leads 58, register 54 may be a shift-right, or shift-left register.

The circuit of FIGURE 1 includes a firth single-pole, double-throw switch 60. It is normally in the position shown, but is switched to its second position in response to the transfer signal $T_T$. The output of switch 60 is applied as one input to an AND gate 62. This AND gate is active when the stored information is being read out of the register A in reverse order. A second AND gate 64 is employed to read the information out of register A in its original order.

In the operation of the register A of FIGURE 1, the switches 41–44 and 60 are normally in the position shown. Each time a shift pulse $T_S$ is applied, the information in the second through the twentieth stage of the shift register is, in each case, shifted one position to the left to the next lower stage, and the information in the first stage is shifted to the twentieth stage. In mathematical terms, the information in each $j$'$^{th}$ stage is shifted to the $$j \underset{n}{\ominus} 1\text{'th}$$

stage, where $$\underset{n}{\ominus}$$

represents modulo $n$ subtraction and $j=1, 2 \ldots n$. The signal $\overline{RV}$ represents the bit 0 ($\overline{\overline{RV}}=1$) so that AND gate 64 is primed. (Here and elsewhere in this application it is assumed, arbitrarily, that a relatively high signal level represents the bit 1 and a relatively low signal level, the bit 0). Each shift pulse $T_S=1$ acts as a second priming signal for AND gate 64. Therefore, each time a pulse $T_S$ occurs, the bit stored in the first stage of the shift register is read out via AND gate 64 to output lead 70. If the bits initially stored are in ascending order of significance (reading from left to right in the figure), these bits appear on line 70, in serial fashion, in ascending order, a different bit appearing each time a pulse $T_S$ occurs.

The information stored in the shift register A may be read out in reverse order by applying a control signal (RV) representing a 1 to the switches 41–44. This signal changes the position of the switches 41–44. In the new position of these switches, the first stage of each $i$'th group of stages in the register is disconnected from the last stage of the $$i \underset{k}{\ominus} 1\text{'th}$$

group, and is connected instead to the last stage of the $$i \underset{k}{\oplus} 1\text{'th}$$

group. As an example, stage 6 (the first stage) in group 32 is disconnected from stage 5 (the last stage) in group 31 and is connected instead to stage 15 (the last stage) of group 33. Similarly, stage 1 in group 31 is disconnected from stage 20 in group 34 and is connected instead to stage 10 of group 32.

Assume now that bits $x_1$ through $x_{20}$ are stored in stages 1 through 20, respectively. Each fifth shift pulse $T_S$, a transfer pulse $T_T$ (see FIG. 3) is generated. The first transfer pulse $tt_1$ changes the position of switch 60 so that the switch arm 72 is in contact with terminal 73. The transfer pulse $tt_1$ also primes the transfer gates 52 so that the bits $x_{16}$, $x_{17}$, $x_{18}$ and $x_{19}$ stored in stages 16–19, respectively, are transferred to the four stage shift register 54.

The first shift pulse $s_1$ (FIG. 3) causes all bits in the shift register A to shift one position to the left. During this shift, the 20th bit passes via contact 73 and switch arm 72 to the AND gate 62. This AND gate is primed by the signal $RV=1$ and the first shift pulse $s_1$. Accordingly, the 20th bit $x_{20}$ passes through AND gate 62 to the output lead 70.

The transfer pulse $tt_1$ terminates shortly after the first shift pulse $s_1$ so that the transfer gates 52 become disabled and the switch 60 returns to its original position—the one shown in the drawing. The second shift pulse $s_2$ causes an output indicative of the bit $x_{19}$ to appear on output lead 56. This bit passes through AND gate 62 to output lead 70. The process continues through the fifth shift pulse $s_5$. Upon the completion of this fifth shift pulse, the bits $x_{20}$, $x_{19}$, $x_{18}$, $x_{17}$ and $x_{16}$ have been read out, in the order given. The register 54, which formerly stored bits $x_{19} \ldots x_{16}$ is cleared, as the bits stored therein have been read out and are not fed back from the last to the first stage. At this time, the last group of stages 34 is storing the bits $x_{11} \ldots x_{15}$, in the order given, having received these bits via switch 44. The first group of stages 31 stores the bits $x_{16}, x_{17} \ldots x_{20}$, in the order given, having received these bits via switch 41, and so on.

In response to the sixth shift pulse $s_6$ and the second transfer pulse $tt_2$, the fifteenth bit $x_{15}$ passes from the last stage 20 of groups 34, through switch 60 and AND gate 62, to the output lead 70, and the bits $x_{11} \ldots x_{14}$ pass from stages 16–19 through the transfer gates 52 to the four-stage shift register 54. The bits $x_{14} \ldots x_{11}$ are subsequently shifted from register 52 to output lead 70, in the order given. This process continues for as long as the reverse signal RV remains a value indicative of the bit 1. If it remains a 1 for the duration of 20 shift pulses, then the entire contents of the shift register A is read out, in reverse order.

FIGURE 2 shows one implementation, by way of example, of a switch. It includes two AND gates 46 and 48 and an inverter 50. An input RV is applied directly to one of the AND gates and through the inverter 50 to the other AND gate. When RV represents the binary digit (bit) 1, AND gate 46 is primed and AND gate 48 is disabled; when RV represents the bit 0, AND gate 46 is disabled and AND gate 48 is primed.

In one practical design of a twenty stage register according to this invention, the circuit shown employs 11 additional logic elements above the number required for a one-way shift register. These elements are 5 control switches, 4 register stages and 2 dual transfer gates. A two-way shift register of conventional design would have required 20 additional logic elements. In practice, shift registers may have many more than 20 stages and, in these cases, the saving made possible by the present circuit is even greater.

While the invention is illustrated in terms of a twenty-stage register, it is to be appreciated that this is merely an example. The register may include many more (or less) than twenty stages, and each group may include more or fewer than the five stages shown.

The register 54 is shown as a four-stage register. In practice, this has been found to be a desirable arrangement. However, alternatives are possible. As one example, it may be a five-stage register into which all five bits stored in group 34 are transferred and from which these five bits are read out, in reverse sequence. This permits the switch 60 to be eliminated; however, an additional transfer gate is needed. Overall, the arrangement shown is more economical.

What is claimed is:

1. In combination:

a first one-way shift register having $n$ storage stages and subdivided into $k=n/x$ groups of $x$ stages each, the first stage of each $i$'th group being connected to the last stage of the $$i \underset{k}{\ominus} 1\text{'th}$$

group, said register storing bits in a certain order, where $n$, $k$ and $x$ are integers, $i=1, 2 \ldots k$, and $$\underset{k}{\ominus}$$

represents modulo $k$ subtraction;

a second one-way shift register, this one with at least $x-1$ stages;

means for applying shift pulses to both of said registers, in the case of the first register, for shifting the information stored in each $j$'th stage to the $$j \underset{n}{\ominus} 1\text{'th}$$

stage and, in the case of the second register, for shifting the information stored from stage to stage; where $j=1, 2 \ldots n$, and $$\underset{n}{\ominus}$$

represents modulo $n$ subtraction;

an output terminal at one of said stages of said first register at which the stored bits may be read out in serial fashion in said certain order in response to said shift pulses;

an output terminal at one of the stages of the second register at which the bits stored therein may be read out in serial fashion in response to said shift pulses;

switch means associated with said first register for disconnecting the first stage of each $i$'th group from the last stage of the $$i \underset{n}{\ominus} 1\text{'th}$$

group and for connecting the first stage of each $i$'th group to the last stage of the $$i \underset{k}{\oplus} 1\text{'th}$$

group, where $$\underset{k}{\oplus}$$

represents modulo $k$ addition; and means for transferring at least the first $x-1$ bits stored in one of said groups of stages in the first register into the second register, in an order such that they are shifted out of the second register in an order which is the reverse of that in which they are stored in the first register, each $x'^{th}$ shift pulse.

2. The invention as set forth in claim 1 wherein the second shift register has exactly $x-1$ stages, further including means for reading out the bit stored in the $x'^{th}$ stage of said one group of stages concurrently with the transfer of the remaining $x-1$ bits in said one group of stages to said second register.

3. The invention as set forth in claim 2 wherein said last-named means comprises a switch and means for actuating said switch once each $x'^{th}$ shift pulse.

No references cited.

BERNARD KONICK, *Primary Examiner.*

T. W. FEARS, *Assistant Examiner.*